3,247,209
**MANUFACTURE OF N-SUBSTITUTED-1,2,3,4-
TETRAHYDROQUINOLINES**
Louis Schmerling, Riverside, Ill., assignor to Universal
Oil Products Company, Des Plaines, Ill., a corporation
of Delaware
No Drawing. Filed Mar. 19, 1963, Ser. No. 266,216
5 Claims. (Cl. 260—283)

This invention relates to a novel method of preparing N-substituted-1,2,3,4-tetrahydroquinolines.

N-substituted-1,2,3,4-tetrahydroquinolines are of varied utility in the chemical field, particularly as intermediates in the preparation of light-sensitive diazonium salts, dyes, pharmaceuticals, oxidative inhibitors, etc. Either when used as such or preferably after nuclear amination and alkylation, the N-substituted-1,2,3,4-tetrahydroquinolines will yield products which retard oxidative deterioration of organic substances including hydrocarbon substrates such as gasoline, kerosene, lubricating oil, fuel oil, etc., or synthetic substrates as, for example, synthetic lubricating oils including dioctyl sebacate, trimethylolpropane polyesters, pentaerythritol, neopentyl glycol, etc., as well as plastics, rubber, etc. When halogenated and particularly chlorinated, the compounds will find utility as insecticides, pesticides, fungicides, herbicides, etc. By suitable nitrosation, reduction and diazotization, effective light-sensitive diazonium salts are prepared which are used in the diazo printing process.

In one embodiment the present invention relates to a process for preparing N-substituted-1,2,3,4-tetrahydroquinoline which comprises reacting a quinoline with a carbonyl compound at reductive alkylation conditions in the presence of hydrogen and a reductive alkylation catalyst, and thereafter separating said N-substituted-1,2,3,4-tetrahydroquinoline from the reaction products.

From the hereinbefore embodiment, it will be seen that the novel process of the present invention comprises the reductive alkylation of quinoline with a carbonyl compound. This reaction is surprising in view of the fact that the nitrogen atom in quinoline does not contain a replaceable hydrogen. In the reductive alkylation processes of the prior art, the nitrogen atom always contained a replaceable hydrogen which, when reacted with additional hydrogen and a carbonyl compound, resulted in the formation of the reductively alkylated product and water. In the case of quinoline, the nitrogen does not contain a replaceable hydrogen and it certainly is unexpected that it undergoes the reductive alkylation reaction. Another advantage of the novel process of the present invention is that the primary product comprises an N - substituted - 1,2,3,4 - tetrahydroquinoline, which means that only the heterocyclic ring of the quinoline is hydrogenated.

The particular quinoline compound to be used as a starting material will depend upon the desired use of the end product. In one embodiment quinoline is a preferred reactant. It is understood that the quinoline need not be pure quinoline, but may comprise the less costly commercial or practical grade which includes, for example, a minor portion of quinaldine and isoquinoline. On the other hand, the quinoline compound may comprise isoquinoline. In still another embodiment the quinoline charge may comprise quinaldine or other quinoline compounds having nuclear substituents, the substituents preferably being alkyl or cycloalkyl. Alkyl substituents include methyl, ethyl, propyl, butyl, pentyl, hexyl, heptyl, octyl, etc., and cycloalkyl derivatives include cyclopropyl, cyclobutyl, cyclohexyl, cycloheptyl, cyclooctyl, etc. It is understood that two or more of these substituents may be attached to one or both of the quinoline rings. Illustrative but not limiting examples in this embodiment include 2-alkylquinoline, 3-alkylquinoline, 4-alkylquinoline, 5-alkylquinoline, 6-alkylquinoline, 7-alkylquinoline, 8-alkylquinoline, 2,5-dialkylquinoline, 3,6-dialkylquinoline, 4,8-dialkylquinoline, 3,4,5-trialkylquinoline, 3,4,6-trialkylquinoline, 3,4,7-trialkylquinoline, 3,4,8-trialkylquinoline, 3,4,5,6-tetraalkylquinoline, 3,4,6,7-tetraalkylquinoline, 3,4,7,8-tetraalkylquinoline, etc., 2-cycloalkylquinoline, 3 - cycloalkylquinoline, 4 -cycloalkylquinoline, 5 - cycloalkylquinoline, 6 - cycloalkylquinoline, 7-cycloalkylquinoline, 8 - cycloalkylquinoline, 3,6-dicycloalkylquinoline, 3,8 - dicycloalkylquinoline, 4,8 - dicycloalkylquinoline, etc., 3 - alkyl-7-cycloalkylquinoline, 4-alkyl-8-cycloalkylquinoline, 4,5 - dialkyl - 8-cycloalkylquinoline, etc., the alkyl and cycloalkyl groups preferably being selected from those hereinbefore specifically set forth.

During the course of the reductive alkylation of quinoline, varying amounts of 1,2,3,4-tetrahydroquinoline are formed as by-products. The 1,2,3,4-tetrahydroquinoline preferably is recycled to the reductive alkylation zone for further conversion therein. Accordingly, in another embodiment of the invention, 1,2,3,4-tetrahydroquinoline may comprise the quinoline charge to the process.

Any suitable carbonyl compound is used in the reductive alkylation. When a secondary alkyl substituent is desired, the carbonyl compound preferably comprises a ketone including, for example, acetone, methyl ethyl ketone, methyl propyl ketone, methyl butyl ketone, methyl pentyl ketone, methyl hexyl ketone, methyl heptyl ketone, methyl octyl ketone, methyl nonyl ketone, methyl decyl ketone, methyl undecyl ketone, methyl dodecyl ketone, etc., diethyl ketone, ethyl propyl ketone, ethyl butyl ketone, ethyl pentyl ketone, ethyl hexyl ketone, ethyl heptyl ketone, ethyl octyl ketone, ethyl nonyl ketone, ethyl decyl ketone, ethyl undecyl ketone, ethyl dodecyl ketone, etc., dipropyl ketone, propyl butyl ketone, propyl pentyl ketone, propyl hexyl ketone, propyl heptyl ketone, propyl octyl ketone, propyl nonyl ketone, propyl decyl ketone, propyl undecyl ketone, propyl dodecyl ketone, etc., dibutyl ketone, butyl pentyl ketone, butyl hexyl ketone, butyl heptyl ketone, butyl octyl ketone, butyl nonyl ketone, butyl decyl ketone, butyl undecyl ketone, butyl dodecyl ketone, etc., dipentyl ketone, pentyl hexyl ketone, pentyl heptyl ketone, pentyl octyl ketone, pentyl nonyl ketone, pentyl decyl ketone, pentyl undecyl ketone, pentyl dodecyl ketone, etc., dihexyl ketone, hexyl heptyl ketone, hexyl octyl ketone, hexyl decyl ketone, hexyl undecyl ketone, hexyl dodecyl ketone, etc., diheptyl ketone, heptyl octyl ketone, heptyl nonyl ketone, heptyl decyl ketone, heptyl undecyl ketone, heptyl dodecyl ketone, etc., dioctyl ketone, octyl nonyl ketone, octyl decyl ketone, octyl undecyl ketone, octyl dodecyl ketone, etc.

When a primary alkyl substituted is desired, an aldehyde preferably is used including, for example,, formaldehyde, acetaldehyde, propionaldehyde, n-butyraldehyde, isobutyraldehyde, n-valeraldehyde, isovaleraldehyde, n-caproaldehyde, n-heptaldehyde, stearaldehyde, etc.

When cyclic substituents are desired, a cyclic ketone or aldehyde is employed including, for example, cyclopentanone, cyclohexanone, 2-methylcyclohexanone, cycloheptanone, cyclooctanone, etc., or alkyl cycloalkyl ketones including, for example, methyl cyclohexyl ketone, ethyl cyclohexyl ketone, propyl cyclohexyl ketone, butyl cyclohexyl ketone, etc., cyclopentylformaldehyde, cyclohexaneacetaldehyde, cycloheptaneacetaldehyde, etc., or aryl ketones and aldehydes including acetophenone, benzophenone, benzaldehyde, phenylacetaldehyde, etc.

In still another embodiment the alkylating agent may comprise an acetal or ketal including, for example, dimethyl acetal, 2,2-dimethoxypropane, 2,2-diethoxypropane, 2,2-dipropoxypropane, 2,2-dimethoxybutane, 2,2-diethoxybutane, 2,2-dipropoxybutane, etc.

Illustrative but not limiting N-substituted-1,2,3,4-tetrahydroquinolines (which also may be named 1-substituted-1,2,3,4-tetrahydroquinoles) include N-methyl-1,2,3,4-tetrahydroquinoline (i.e., 1-methyl-1,2,3,4-tetrahydroquinoline), N-ethyl-1,2,3,4-tetrahydroquinoline, N-propyl-1,2,3,4-tetrahydroquinoline, N-isopropyl-1,2,3,4-tetrahydroquinoline, N-butyl-1,2,3,4-tetrahydroquinoline, N-iso-butyl-1,2,3,4-N-sec-butyl-1,2,3,4 - tetrahydroquinoline, N-pentyl-1,2,3,4-tetrahydroquinoline, etc.; N-cyclopentyl-1,2,3,4-tetrahydroquinoline, N-cyclohexyl-1,2,3,4-tetrahydroquinoline, N-cycloheptyl-1,2,3,4-tetrahydroquinoline, etc.; N-(cyclohexylmethyl)-1,2,3,4-tetrahydroquinoline, N-(2-cyclohexylethyl)-1,2,3,4-tetrahydroquinoline, etc.; N-benzyl-1,2,3,4-tetrahydroquinoline, N-(1-phenylethyl)-1,2,3,4-tetrahydroquinoline, N-(2-phenylethyl)-1,2,3,4-tetrahydroquinoline, N-(diphenylmethyl)-1,2,3,4-tetrahydroquinoline, etc.

It is understood that a mixture of quinoline compounds and/or alkylating agents may be employed and that the different alkylating agents are not necessarily equivalent in their ease of reaction with the same or different quinoline compound.

The reductive alkylation is effected in the presence of hydrogen and a reductive alkylation catalyst. Hydrogen pressures will range from atmospheric and preferably from 10 to 300 atm. or higher and more particularly will be within the range of from about 10 to about 100 atm. Any suitable reductive alkylation catalyst is employed. A particularly preferred catalyst comprises from about 0.5 to 5% by weight of platinum composited with alumina. Other carriers include silica, zirconia, titania, thoria, zinc oxide, etc., or mixtures with and without alumina. Other catalysts comprise those containing palladium, nickel, cobalt, molybdenum, etc., preferably as a composite with a suitable carrier. A specific catalyst comprises a mixture of the oxides of chromium, cobalt and palladium. The specific temperature to be employed will depend upon the particular catalyst but, in general, will be in the range of from about 60° to about 250° C. and more particularly within the range of from about 150° to about 180° C. The time of contact will be correlated with the temperature, pressure and catalyst in order to obtain the desired reductive alkylation and to minimize excessive hydrogenation of the quinoline ring. In general, the contact time will be within the range of from about 0.5 to 24 hours or more. The carbonyl compound is used in a proportion of at least 1 mole thereof per mole of quinoline compound, but may be used in a mole ratio of from about 1:1 and preferably from about 1.5:1 to 20:1 or more of carbonyl compound to quinoline compound.

The reductive alkylation is effected in any suitable manner and may be a batch type or continuous type of operation. In a batch type of operation the reactants, catalyst and hydrogen are commingled in a reaction zone and maintained at the desired temperature and pressure for a time sufficient to effect the desired reductive alkylation. Following completion of the reaction, the catalyst is removed by filtration or otherwise and the desired reductively alkylated product is separated from the other reaction products by conventional means.

In a preferred embodiment the reductive alkylation is effected in a continuous type of operation in which the catalyst is disposed as a fixed bed in a reaction zone and the quinoline compound, carbonyl compound and hydrogen are passed, at the desired temperature and pressure and either in upward or downward flow, into contact with the catalyst. The reactor effluent then is passed into a zone of reduced pressure, wherefrom excess hydrogen is released and preferably recycled, at least in part, to the reaction zone. The liquid products then are fractionated or otherwise treated to separate and recover the desired reductively alkylated product from the other products of the process. Any unreacted quinoline or the intermediate product of 1,2,3,4-tetrahydroquinoline preferably also is recycled to the reaction zone for further conversion.

The following examples are introduced to illustrate further the novelty and utility of the present invention but not with the intention of unduly limiting the same.

*Example I*

N-isopropyl-1,2,3,4-tetrahydroquinoline was prepared as follows. A mixture of 68 g. (0.48 mole) of quinoline, 70 g. (1.21 moles) of acetone and 15 g. of a sulfided catalyst comprising about 0.4% platinum composited with alumina was heated at about 160° C. for 12 hours under 100 atm. initial hydrogen pressure. The reaction was effected in a glass liner contained in a rotating autoclave. The hydrogen pressure decreased during the reaction to 70 atm. at the reaction temperature; the final pressure at room temperature was 40 atm. Following completion of the reaction, the reaction product was filtered to separate the catalyst and the filtrate was distilled under reduced pressure. There was obtained 55 g. (61% yield) of liquid product boiling chiefly at 85–87° C. at 0.5 mm. pressure. The liquid product had a refractive index, $n_D^{21}$, of 1.561 and was shown by NMR analysis to comprise primarily N-isopropyl-1,2,3,4-tetrahydroquinoline.

*Example II*

As hereinbefore set forth, 1,2,3,4-tetrahydroquinoline is formed as a by-product in the reaction described in Example I. The present example describes the reductive alkylation of 1,2,3,4-tetrahydroquinoline with acetone. In this reaction, which was effected in substantially the same manner described in Example I, 59 g. (0.41 mole) of 1,2,3,4-tetrahydroquinoline, 101 g. (1.74 moles) of acetone and 10 g. of the platinum-alumina catalyst were reacted in the presence of an initial hydrogen pressure of 100 atm. at 160° C. for 12 hours. N-isopropyl-1,2,3,4-tetrahydroquinoline was recovered from the reaction products in an amount of 65 g., which corresponds to an 85% yield. The product similarly was identified by NMR analysis.

*Example III*

N-sec-butyl-1,2,3,4-tetrahydroquinoline was prepared as follows. A mixture of 100 g. (0.71 mole) of practical quinoline (91% quinoline and 9% of quinaldine, isoquinoline and water), 100 g. (1.39 moles) of methyl ethyl ketone and 15 g. of sulfided platinum-alumina catalyst was heated at 160° C. under 130 atm. initial hydrogen pressure for 12 hours in a glass liner positioned in a rotating autoclave. The pressure dropped to 56 atm. at 160° C. and was 30 atm. when the autoclave was cooled to room temperature. Following completion of the reaction, the catalyst was removed by filtration and the filtrate was distilled under reduced pressure to yield 26 g. of N-sec-butyl-1,2,3,4-tetrahydroquinoline, as well as 56.5 g. of other material. The latter material was commingled with 70 g. of methyl ethyl ketone and 15 g. of the sulfided platinum-alumina catalyst and heated at 160° C. for an additional 12 hours under 125 atm. of hydrogen pressure. Following completion of this reaction, the catalyst was separated by filtration and the product distilled to yield an additional 35 g. of N-sec-butyl-1,2,3,4-tetrahydroquinoline. The product which was identified by NMR analysis boiled largely at 93–95° C. at 2.3–2.4 mm. (about 268–270° C. at atmospheric pressure) and had a refractive index, $n_D^{22}$, of 1.552. Accordingly, there was recovered 61 g. of the desired N-sec-butyl-1,2,3,4-tetrahydroquinoline.

*Example IV*

The product of this example is N-n-butyl-1,2,3,4-tetrahydroquinoline and was prepared as follows. A mixture of 75 g. (0.53 mole) of practical quinoline, 100 g. (1.39 moles) of n-butyraldehyde and 15 g. of sulfided platinum-alumina catalyst was heated at 160° C. under 125 atm. initial hydrogen pressure for 12 hours. Following completion of the reaction, the catalyst was separated by filtration and the liquid product was distilled under reduced pressure to yield 84 g. of a product shown by NMR analysis to comprise principally N-n-butyl-1,2,3,4-tetrahydroquinoline. This corresponds to a yield of 79%. The product boiled largely at 107–109° C. at 2.3–2.4 mm. (275–277° C. at atmospheric pressure) and had a refractive index, $n_D^{23}$, of about 1.547.

*Example V*

The product of this example is N-isobutyl-1,2,3,4-tetrahydroquinoline and was prepared by reacting 75 g. (0.53 mole) of practical quinoline and 100 g. (1.39 moles) of isobutyraldehyde in the presence of 125 atm. initial hydrogen pressure and 15 g. of platinum-alumina catalyst. This reaction was effected in substantially the same manner described in the previous examples. Distillation of the liquid product yielded 70 g. (66% yield) of N-isobutyl-1,2,3,4-tetrahydroquinoline (identified by NMR analysis), boiling chiefly at 107–108° C. at 2 mm. (269–271° C. at atmospheric pressure) and having a refractive index, $n_D^{22}$, of 1.547.

*Example VI*

The product of this example is N-cyclohexyl-1,2,3,4-tetrahydroquinoline and was prepared in substantially the same manner hereinbefore described by reacting 78 g. (0.55 mole) of practical quinoline with 125 g. (1.28 moles) of cyclohexanone at 160° C. under an initial hydrogen pressure of 120 atm. for 12 hours. There was recovered 70 g. of N-cyclohexyl-1,2,3,4-tetrahydroquinoline from the liquid product. This corresponds to a 56% yield. The product boiled chiefly at 123–128° C. at 1.4–1.8 mm. (about 318–323° C. at atmospheric pressure) and had an index of refraction, $n_D^{23}$, of 1.572.

I claim as my invention:

1. A process for preparing N-isopropyl-1,2,3,4-tetrahydroquinoline which comprises reacting quinoline with acetone in the presence of hydrogen and a platinum catalyst at a reductive alkylation temperature of from about 60° to about 250° C., a hydrogen pressure of from about 10 atmospheres to about 300 atmospheres and a mole ratio of said acetone to said quinoline of from about 1:1 to about 20:1, and thereafter separating said N-isopropyl-1,2,3,4-tetrahydroquinoline from the reaction products.

2. A process for preparing N-sec-butyl-1,2,3,4-tetrahydroquinoline which comprises reacting quinoline with methyl ethyl ketone in the presence of hydrogen and a platinum catalyst at a reductive alkylation temperature of from about 60° to about 250° C., a hydrogen pressure of from about 10 atmospheres to about 300 atmospheres and a mole ratio of said ketone to said quinoline of from about 1:1 to about 20:1, and thereafter separating said N-sec-butyl-1,2,3,4-tetrahydroquinoline from the reaction products.

3. A process for preparing N-cyclohexyl-1,2,3,4-tetrahydroquinoline which comprises reacting quinoline with cyclohexanone in the presence of hydrogen and a platinum catalyst at a reductive alkylation temperature of from about 60° to about 250° C., a hydrogen pressure of from about 10 atmospheres to about 300 atmospheres and a mole ratio of said cyclohexanone to said quinoline of from about 1:1 to about 20:1, and thereafter separating said N-cyclohexyl-1,2,3,4-tetrahydroquinoline from the reaction products.

4. A process for preparing N-substituted-1,2,3,4-tetrahydroquinoline from a quinoline whose nitrogen atom is unsubstituted and having no substituents other than alkyl and cycloalkyl groups, which comprises catalytically reductively alkylating said quinoline in the presence of hydrogen with a ketone selected from the group consisting of alkyl ketones of from 3 to 21 carbon atoms per molecule and cyclic ketones having from 5 to 8 carbon atoms in the ring at a reductive alkylation temperature of from about 60° to about 250° C., a hydrogen pressure of from about 10 atmospheres to about 300 atmospheres and a mole ratio of said ketone to said quinoline of from about 1:1 to about 20:1 to alkylate said nitrogen atom, and thereafter separating the resultant N-alkyl-1,2,3,4-tetrahydroquinoline from the reaction products.

5. The process of claim 4 further characterized in that said quinoline and ketone are reacted in the presence of a platinum catalyst.

References Cited by the Examiner

UNITED STATES PATENTS 3,127,405   3/1964   Schnider et al. _____ 260—283

OTHER REFERENCES

Adkins et al., J. Am. Chem. Soc., Volume 70, pages 695–8 (1948).

Bell, J. Chem. Soc. (London), 1953, pages 348–9.

Elderfield, "Heterocyclic Compounds," Vol. IV Wiley, 1952, pp. 282–285.

Forsee, J. Am. Chem. Soc., Volume 57, pages 1788–9 (1935).

Tsushima, Chem. Abstracts, Volume 41, column 3801 (1947).

Wright, J. Org. Chem., Volume 24, pages 1016–18 (1959).

HENRY R. JILES, *Acting Primary Examiner.*

DON M. KERR, DONALD G. DAUS,
*Assistant Examiners.*